United States Patent
O'Heeron et al.

(10) Patent No.: US 12,544,408 B2
(45) Date of Patent: Feb. 10, 2026

(54) PREVENTION AND TREATMENT OF KIDNEY FAILURE BY ADMINISTRATION OF FIBROBLASTS AND PRODUCTS THEREOF

(71) Applicant: SPINALCYTE LLC, Houston, TX (US)

(72) Inventors: Pete O'Heeron, Houston, TX (US); Thomas Ichim, San Diego, CA (US)

(73) Assignee: SPINALCYTE LLC, Houston, TX (US)

( * ) Notice: Subject to any disclaimer, the term of this patent is extended or adjusted under 35 U.S.C. 154(b) by 672 days.

(21) Appl. No.: 17/757,309

(22) PCT Filed: Dec. 22, 2020

(86) PCT No.: PCT/US2020/066585
§ 371 (c)(1),
(2) Date: Jun. 14, 2022

(87) PCT Pub. No.: WO2021/133790
PCT Pub. Date: Jul. 1, 2021

(65) Prior Publication Data
US 2022/0370505 A1    Nov. 24, 2022

Related U.S. Application Data

(60) Provisional application No. 62/953,836, filed on Dec. 26, 2019.

(51) Int. Cl.
*A61K 35/33*     (2015.01)
*A61K 31/155*    (2006.01)
*A61P 13/12*     (2006.01)

(52) U.S. Cl.
CPC ............ *A61K 35/33* (2013.01); *A61K 31/155* (2013.01); *A61P 13/12* (2018.01)

(58) Field of Classification Search
CPC ...................................................... A61K 35/33
See application file for complete search history.

(56) References Cited

U.S. PATENT DOCUMENTS

2011/0104100 A1    5/2011    Riordan et al.

FOREIGN PATENT DOCUMENTS

WO    2018/183653 A1    10/2018
WO    2019/108756 A1    6/2019

OTHER PUBLICATIONS

Strutz et al., "Renal fibroblasts and myofibroblasts in chronic kidney disease," J Am Soc Nephrol 17:2992-2998, 2006.*

(Continued)

*Primary Examiner* — Rosanne Kosson
(74) *Attorney, Agent, or Firm* — Norton Rose Fulbright LLP

(57) ABSTRACT

The disclosure provides means, methods, and compositions of preventing, reducing, and treating kidney failure through the administration of fibroblasts, modified fibroblasts, and/or products derived from fibroblasts. The disclosure may also concern administration of fibroblasts prior to, concurrent with, or subsequent to administration of a nephrotoxic agent results in production of renal function. In some embodiments, fibroblasts are enhanced for augmentation of nephron-regenerative properties through culture under means including hypoxia, histone deacetylase inhibitor treatment, oxytocin, and/or DNA methyltransferase inhibitors.

22 Claims, 1 Drawing Sheet

(56) References Cited

OTHER PUBLICATIONS

Extended European Search Report issued in European Patent Application No. 20905517.7, dated Oct. 2, 2023.
Görldt et al., "Fibroblast CD73 Controls the Interstitial Adenosine Microenvironment, Inflammation and Fibrosis after Kidney Ischemia-Reperfusion Injury (IRI)," Journal of the American Society of Nephrology, 27(Abstract No. TH-P0159):130A-131A, 2016.
Perry et al., :Perivascular CD73+ cells attenuate inflammation and interstitial fibrosis in the kidney microenvironment, Am. J. Physiol. Renal. Physiol., 317(3):F658-F669, 2019.
Lin et al. "Adipose tissue-derived mesenchymal stem cells: fat chance of curing kidney disease?", *Kidney International,* vol. 82, No. 7, pp. 731-733, 2012.
Li et al., "Mobilized human hematopoietic stem/progenitor cells promote kidney repair after ischemia/reperfusion injury," Circulation, 121(20):2211-2220, 2010.
PCT International Search Report and Written Opinion issued in International Application No. PCT/US2020/066585, 13 pages, dated Mar. 16, 2021.

\* cited by examiner

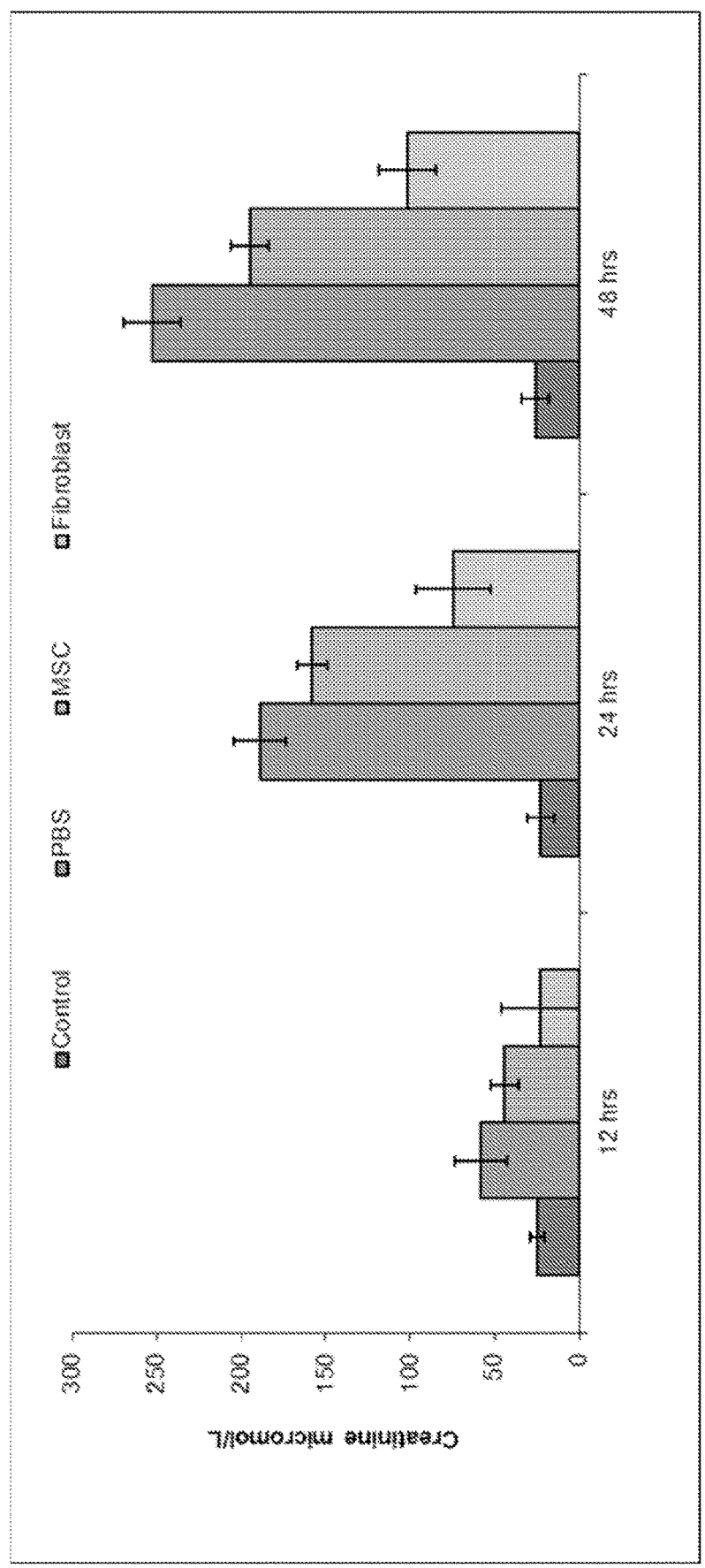

PREVENTION AND TREATMENT OF KIDNEY FAILURE BY ADMINISTRATION OF FIBROBLASTS AND PRODUCTS THEREOF

This application is a national phase application under 35 U.S.C. § 371 that claims priority to International Application No. PCT/US2020/066585, filed Dec. 22, 2020, which claims priority to U.S. Provisional Patent Application Ser. No. 62/953,836, filed Dec. 26, 2019, both of which are incorporated by reference herein in their entirety.

TECHNICAL FIELD

Embodiments of the disclosure include at least the fields of cell biology, molecular biology, nephrology, and medicine.

BACKGROUND

Kidney failure presents either as a chronic condition or an acute situation. Chronic kidney disease can progress to end-stage renal failure that causes irreversible glomerular and tubular damage leading to the loss of renal function. Apoptosis, oxidative damage, and microvascular rarefaction are responsible for glomerular and tubulointerstitial fibrosis in chronic kidney disease. Acute kidney injury (AKI) is a clinical disorder characterized by the sudden loss of kidney function, and such function includes excreting wastes, maintaining electrolyte and acid-base balance, and maintaining body fluid levels. The clinical signs of AKI are sudden illness, vomiting, anorexia, weight loss, exercise intolerance, and eventually death. AKI presents as an acute deterioration in renal excretory function within hours or days, resulting in the accumulation of "uremic toxins" and, importantly, a rise in the blood levels of potassium, hydrogen, and other ions. This accumulation contributes to life threatening multisystem complications such as bleeding, seizures, cardiac arrhythmias or arrest, and possible volume overload with pulmonary congestion and poor oxygen uptake. The most common cause of AKI is an ischemic insult of the kidney resulting in injury of renal tubular and postglomerular vascular endothelial cells. The principal etiologies for this ischemic form of AKI include intravascular volume contraction, resulting from bleeding, thrombotic events, shock, sepsis, major cardiovascular surgery, arterial stenoses, and others. AKI can be caused nephrotoxic agents such as radiocontrast agents or a significant number of frequently used medications including chemotherapeutic drugs, antibiotics and certain immunosuppressants such as cis-Platinum and cyclosporine. Patients most at risk for all forms of AKI include diabetics, those with underlying kidney, liver, and/or cardiovascular disease, the elderly, recipients of a bone marrow transplant, and those with cancer or other debilitating disorders.

The present disclosure satisfies a long felt need in the art by providing effective prevention and treatment of one or more kidney diseases.

BRIEF SUMMARY

The present disclosure is directed to systems, methods, and compositions for preventing or treating an individual having or at risk of having kidney disease. Certain embodiments of the disclosure concern preventing or treating the loss of or reduction of kidney function, including resulting from one or more diseases and/or nephrotoxic compositions. The disease causing a loss of function in the kidney may be immune-mediated, infection-mediated, metabolism-mediated, hormone-mediated, genetically-mediated, or mediated by any other biological process, in certain embodiments. In some embodiments, the disclosure concerns treatment or prevention for exposure to one or more nephrotoxic compositions and/or agents to an individual, whether intentionally or accidentally. The nephrotoxic compositions and/or agents may include, but are not limited to, chemotherapies, radiation, immune-modulating compositions or agents, non-steroid anti-inflammatory drugs (NSAIDs), antibiotics, antifungals, antivirals, diuretics, beta blockers, ACE inhibitors, vasodilators, cyclosporins, steroids, narcotics, combinations thereof, or any other composition and/or agent that may induce nephrotoxicity.

In certain embodiments, the kidney disease is quantified by a glomerular filtration rate (GFR) or estimated GFR. In certain embodiments, the loss of kidney function may comprise a change in the level of one or more serum and/or blood markers including, but not limited to, creatinine, blood urea nitrogen (BUN), cystatin C, beta-trace protein, podocalyxin, nephrin, alpha 1-microglobulin, beta 2-microglobulin, glutathione S-transferase, interleukin-18, kidney injury molecule-1 (KIM-1), liver-type fatty acid-binding protein, netrin-1, liver-type fatty acid-binding protein, neutrophil gelatinase-associated lipocalcin (NGAL), n-acetyl-beta-d-glucosaminidase (NAG), or a combination thereof. The change in level may or may not be assessed prior to and/or after treatment of loss of kidney function in the individual.

In some embodiments, the disease and/or exposure to one or more nephrotoxic compositions causes an increase in the serum creatinine in an individual, and the level of serum creatinine may or may not be determined in the individual prior to and/or after treatment of loss of kidney function in the individual. In some cases, the increase in serum creatinine may be more than 0.5 mg/dL over a baseline measurement performed on the individual. The increase in serum creatinine may be an increase between 0.3 mg/dL to 0.5 mg/dL over a baseline measurement performed on the individual. In some embodiments, the serum creatinine levels in an individual having, or at risk of having, kidney disease may be more than 1.0, 1.1, 1.2, 1.3, 1.4, 1.5, 1.6, 1.7, 1.8, 1.9, 2.0, 2.1, 2.2, 2.3, 2.4, 2.5, 3.0, 4.0, 5.0 mg/dL or higher.

Certain embodiments of the present disclosure concern the administration of an effective amount of fibroblasts, modified fibroblasts, and/or products derived from fibroblasts, to an individual having, or at risk of having, kidney disease, including any kidney disease or partial or full loss of kidney function described herein. The fibroblasts, modified fibroblasts, and/or products derived from fibroblasts, may be administered in any suitable manner, including intra-arterially and/or intravenously, merely as examples. In some embodiments, the fibroblasts, modified fibroblasts, and/or products derived from fibroblasts, are administered to an individual of the present disclosure therapeutically and/or prophylactically. The fibroblasts, modified fibroblasts, and/or products derived from fibroblasts, may be administered to the individual at the onset or initial diagnosis of the kidney disease. The fibroblasts, modified fibroblasts, and/or products derived from fibroblasts, may be administered less than about 24 hours or less than about 48 hours after the onset or diagnosis of the kidney disease. The fibroblasts, modified fibroblasts, and/or products derived from fibroblasts, may be administered more than about 24 hours or more than about 48 hours after the onset or diagnosis of the kidney disease. The fibroblasts, modified fibroblasts, and/or products derived from fibroblasts, may be administered between about 24 to about 48 hours after the onset or diagnosis of the kidney disease. The fibroblasts, modified fibroblasts, and/or products derived from fibroblasts, may be administered approximately 24, 26, 28, 30, 32, 34, 36, 38, 40, 42, 44, 46, or 48 hours after the onset or diagnosis of the kidney disease.

In some embodiments, an individual receiving methods and compositions of the present disclosure is administered a prophylactically or therapeutically effective amount of fibroblasts, modified fibroblasts, and/or products derived from fibroblasts, of the present disclosure. The prophylactically or therapeutically effective amount of fibroblasts, modified fibroblasts, and/or products derived from fibroblasts, may be between approximately $7 \times 10^5$ cells/kg of individual's body weight and approximately $7 \times 10^6$ cells/kg of individual's body weight. In some embodiments, the prophylactically or therapeutically effective amount of fibroblasts, modified fibroblasts, and/or products derived from fibroblasts, is between about approximately $2 \times 10^6$ cells/kg of individual's body weight and approximately $5 \times 10^6$ cells/kg of individual's body weight. In some embodiments, the prophylactically or therapeutically effective amount of fibroblasts, modified fibroblasts, and/or products derived from fibroblasts, approximately $2 \times 10^6$ cells/kg of individual's body weight.

In some embodiments, the fibroblasts, modified fibroblasts, and/or products derived from fibroblasts, of the present disclosure are from an autologous source with respect to an individual subjected to the methods of the present disclosure. In some embodiments, the fibroblasts, modified fibroblasts, and/or products derived from fibroblasts, of the present disclosure are from an allogeneic source with respect to an individual subjected to methods of the present disclosure. The fibroblasts, modified fibroblasts, and/or products derived from fibroblasts, of the present disclosure may be from any source or tissue including fibroblasts derived from at least placenta, endometrial cells, skin, adipose tissue, bone marrow, umbilical cord, Wharton's jelly, omentum, peripheral blood, mobilized peripheral blood, or a combination thereof. In some embodiments, the mobilized peripheral blood is obtained by administration to the individual of agents selected from the group consisting of G-CSF, GM-CSF, flt-3 ligand, plerixafor (including Mozobil™), hyperbaric oxygen, ozone therapy, and a combination thereof. In some embodiments, the fibroblasts, modified fibroblasts, and/or products derived from fibroblasts, express one or more markers including, but not limited to, c-Kit, vimentin, extracellular vimentin, cyclin D2, Snail, E-cadherin, SOX-2, Hey1, SMA, Nkx2.5, GATA4, CD105, CD90, CD29, CD73, CD34, CD44, CD45, WT1, or a combination thereof. In some embodiments, said fibroblasts, modified fibroblasts, and/or products derived from fibroblasts, do not express markers including, but not limited to, CD45, CD34 and CD14, MHC II, and a combination thereof.

In some embodiments, said fibroblasts, modified fibroblasts, and/or products derived from fibroblasts, are capable of differentiating into osteoblasts, adipocytes and/or chondrocytes. In some embodiments, said fibroblasts, modified fibroblasts, and/or products derived from fibroblasts, are hypoimmunogenic. In some embodiments, said fibroblasts, modified fibroblasts, and/or products derived from fibroblasts, are less capable of stimulating allogeneic T cell proliferation compared to epithelial cells. In some embodiments, said fibroblasts, modified fibroblasts, and/or products derived from fibroblasts, are capable of active immune suppression. In some embodiments, said active immune suppression is inhibition of proliferation of an ongoing mixed lymphocyte reaction.

In some embodiments, said fibroblasts, modified fibroblasts, and/or products derived from fibroblasts, express markers including, but not limited to, Oct-4, CD-34, KLF-4, Nanog, Sox-2, Rex-1, GDF-3, Stella, and a combination thereof, and/or express enhanced levels of GDF-11 compared to mesenchymal stem cells.

In some embodiments, said fibroblasts, modified fibroblasts, and/or products derived from fibroblasts, upregulate genes, including, but not limited to, genes involved in the cell cycle, DNA replication, and/or purine metabolism when compared to standard or non-modified fibroblasts or mesenchymal stem cells. In some embodiments, said genes involved in the cell cycle comprise genes capable of expressing cyclins and cyclin dependent kinases. In some embodiments, said fibroblasts, modified fibroblasts, and/or products derived from fibroblasts, downregulate genes, including, but not limited to, genes involved in cell adhesion, extracellular matrix (ECM)-receptor interaction, differentiation, development, TGF-β signaling, and/or TSP-1-induced apoptosis when compared to standard or non-modified fibroblasts or mesenchymal stem cells. In some embodiments, said genes involved in TGF-beta signaling genes comprise SMAD1, SMAD2, SMAD3, SMAD4, GITR, PD-L1, CD5, and/or CD31.

In some embodiments, one or more renoprotective and/or renoregenerative agents are administered along with said fibroblasts, modified fibroblasts, and/or products derived from fibroblasts. In some embodiments, said renoprotective and/or renoregenerative agents include, but are not limited to, metformin and/or analogues thereof.

In some embodiments, said fibroblasts, modified fibroblasts, and/or products derived from fibroblasts, are treated under conditions capable of enhancing nephron-regenerative properties of said fibroblasts, modified fibroblasts, and/or products derived from fibroblasts. In some embodiments, said conditions include, but are not limited to, hypoxia and/or treatment with one or more histone deacetylase inhibitors (e.g., trichostatin A, Valproic acid, and/or phenylbutyrate), oxytocin, and/or one or more DNA methyltransferase inhibitors (e.g., azacytidine, Zebularine, and/or decitabine).

In some embodiments, the fibroblasts, modified fibroblasts, and/or products derived from fibroblasts, are treated before delivery to the individual, during delivery to the individual, and/or after delivery to the individual.

In some embodiments, the fibroblasts of the present disclosure are modified, such as by exposure to one or more compositions, to enhance the ability of the fibroblasts to suppress the production of TGF-beta in Th3 cells. The modification of the fibroblasts may be monitored by assessing the inhibited production of TGF-beta from Th3 cells subsequent to cell-to-cell contact between modified fibroblasts and Th3 cells. Thus, fibroblasts may be modified upon exposure to one or more agents and/or conditions, followed by delivery of the fibroblasts to an individual in need thereof, upon which Th3 cells in the individual subsequently have reduced production of TGF-beta.

A composition for modifying fibroblasts may comprise oxytocin. In some embodiments, the fibroblasts are exposed to a composition, such as oxytocin, for a period between approximately 1 minute to approximately 4 weeks, or between approximately 2 hours to approximately 1 week, or between approximately 24 hours to approximately 72 hours. The fibroblasts may be exposed to oxytocin at a concentration ranging between approximately 10 nM to approximately 10 µM, or between approximately 100 nM to approximately 1 µM.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description.

BRIEF DESCRIPTION OF THE DRAWING

For a more complete understanding of the present disclosure, reference is now made to the following descriptions taken in conjunction with the accompanying drawing, in which:

FIG. 1 demonstrates a particular embodiment of the disclosure showing the renal protective effect (reduced serum creatinine levels) for mice with induced renal ischemia of CD73-positive foreskin fibroblasts, compared to phosphate buffered saline (PBS) or bone marrow mesenchymal stem cells (MSCs). Mice without induced renal ischemia were used as a control. From left to right, the bars are control, PBS, MSCs, and fibroblasts.

DETAILED DESCRIPTION

Certain embodiments of the present disclosure concern the use of fibroblasts, modified fibroblasts, and/or products derived from fibroblasts, for treatment or prevention of kidney failure or kidney disease. In some embodiments, the disclosure concerns the administration of fibroblasts, modified fibroblasts, and/or products derived from fibroblasts, in patients (as one specific example only, allogeneic dermal fibroblasts delivered intravenously) prior to and/or concurrent with and/or subsequent to exposure to one or more nephrotoxic insult. In some embodiments, the nephrotoxic insult includes chemotherapy, for example with Cisplatin, Carboplatin, Carmustine, Mitomycin, and/or Methotrexate), cardiac surgery, septic shock, diabetic nephropathy, medication-induced nephropathy and/or lupus nephropathy. In one embodiment, fibroblasts, modified fibroblasts, and/or products derived from fibroblasts, are grown in the presence of culture conditions that endow and/or augment regenerative activities of the fibroblasts, such conditions including at least hypoxia, growth in the presence of one or more histone deacetylase inhibitors, growth in the presence of one or more DNA methyltransferase inhibitors, and/or oxytocin. In some embodiments of the disclosure, administration of one or more agents that are renoprotective and/or renoregenerative are administered along with fibroblasts, including regenerative fibroblasts. Agents that are useful for the practice of the disclosure include metformin and analogues thereof, merely as examples.

I. Examples of Definitions

In keeping with long-standing patent law convention, the words "a" and "an" when used in the present specification in concert with the word comprising, including the claims, denote "one or more." Some embodiments of the disclosure may consist of or consist essentially of one or more elements, method steps, and/or methods of the disclosure. It is contemplated that any method or composition described herein can be implemented with respect to any other method or composition described herein and that different embodiments may be combined.

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment.

Throughout this application, the term "about" is used according to its plain and ordinary meaning in the area of cell and molecular biology to indicate that a value includes the standard deviation of error for the device or method being employed to determine the value.

The term "comprising," which is synonymous with "including," "containing," or "characterized by," is inclusive or open-ended and does not exclude additional, unrecited elements or method steps. The phrase "consisting of" excludes any element, step, or ingredient not specified. The phrase "consisting essentially of" limits the scope of described subject matter to the specified materials or steps and those that do not materially affect its basic and novel characteristics. It is contemplated that embodiments described in the context of the term "comprising" may also be implemented in the context of the term "consisting of" or "consisting essentially of."

Reference throughout this specification to "one embodiment," "an embodiment," "a particular embodiment," "a related embodiment," "a certain embodiment," "an additional embodiment," or "a further embodiment" or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in one or more embodiments.

A variety of aspects of this disclosure can be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numerical values within that range as if explicitly written out. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. When ranges are present, the ranges may include the range endpoints.

"Express" and "expression" refer to the process by which information (e.g., genetic and/or epigenetic information) is converted into the structures present in a cell or secreted therefrom. Accordingly, as used herein, "expression" may refer to transcription, translation, or polynucleotide and/or polypeptide modifications (e.g., posttranslational modification of a polypeptide).

"Pharmaceutical composition" as used herein refers to any composition that comprises one or more therapeutically or biologically active agents such as cells, fibroblasts, exosomes, apoptotic bodies, and/or conditioned media thereof.

The term "subject," as used herein, may be used interchangeably with the term "individual" and generally refers to an individual in need of a therapy. The subject can be a mammal, such as a human, dog, cat, horse, pig or rodent. The subject can be a patient, e.g., have or be suspected of having or at risk for having a disease or medical condition, including kidney disease, a disease which causes loss of or reduction of kidney function, or exposure to one or more nephrotoxic compositions, for example. For subjects having or suspected of having a medical condition directly or indirectly associated with loss of or reduction of kidney function, the medical condition may be of one or more types. The subject may have a disease or be suspected of having the disease. The subject may be asymptomatic. The subject may be of any gender. The subject may be of a certain age, such as at least 30, 35, 40, 45, 50, 55, 60, 65, 70, 75, 80, 85, 90, 95, or 100 or more.

"Treatment," "treat," or "treating" means a method of reducing the effects of a disease or condition. Treatment can also refer to a method of reducing the disease or condition itself rather than just the symptoms. The treatment can be any reduction from pre-treatment levels and can be but is not limited to the complete ablation of the disease, condition, or the symptoms of the disease or condition. Therefore, in the disclosed methods, treatment" can refer to a 10%, 20%, 30%, 40%, 50%, 60%, 70%, 80%, 90%, or 100% reduction in the severity of an established disease or the disease progression, including reduction in the severity of at least one symptom of the disease. For example, a disclosed method for reducing the immunogenicity of cells is considered to be a treatment if there is a detectable reduction in the immunogenicity of cells when compared to pre-treatment levels in the same subject or control subjects. Thus, the reduction can be a 10, 20, 30, 40, 50, 60, 70, 80, 90, 100%, or any amount of reduction in between as compared to native or control levels. It is understood and herein contemplated that "treatment" does not necessarily refer to a cure of the disease or condition, but an improvement in the outlook of a disease or condition. In specific embodiments, treatment refers to the lessening in severity or extent of at least one symptom and may alternatively or in addition refer to a delay in the onset of at least one symptom.

"Allogeneic," as used herein, refers to cells of the same species that differ genetically from cells of a host.

"Autologous," as used herein, refers to cells derived from the same subject. The term "engraft" as used herein refers to the process of stem cell incorporation into a tissue of interest in vivo through contact with existing cells of the tissue.

"Approximately" or about: As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

"Carrier" or diluent: As used herein, the terms "carrier" and "diluent" refers to a pharmaceutically acceptable (e.g., safe and non-toxic for administration to a human) carrier or diluting substance useful for the preparation of a pharmaceutical formulation. Exemplary diluents include sterile water, bacteriostatic water for injection (BWFI), a pH buffered solution (e.g. phosphate-buffered saline), sterile saline solution, Ringer's solution or dextrose solution.

As used herein, the terms "dosage form" and "unit dosage form" refer to a physically discrete unit of a therapeutic agent for the individual to be treated. Each unit contains a predetermined quantity of active material calculated to produce the desired therapeutic effect. It will be understood, however, that the total dosage of the composition will be decided by the attending physician within the scope of sound medical judgment.

A "dosing regimen" (or "therapeutic regimen"), as that term is used herein, is a set of unit doses (typically more than one) that are administered individually to a subject, typically separated by periods of time. In some embodiments, a given therapeutic agent has a recommended dosing regimen, which may involve one or more doses. In some embodiments, a dosing regimen comprises a plurality of doses each of which are separated from one another by a time period of the same length; in some embodiments, a dosing regimen comprises a plurality of doses and at least two different time periods separating individual doses. In some embodiments, the therapeutic agent is administered continuously over a predetermined period. In some embodiments, the therapeutic agent is administered once a day (QD) or twice a day (BID).

The term "culture expanded population" means a population of cells whose numbers have been increased by cell division in vitro. This term may apply to stem cell populations and non-stem cell populations alike, including fibroblast populations.

The term "passaging" refers to the process of transferring a portion of cells from one culture vessel into a new culture vessel.

The term "cryopreserve" refers to preserving cells for long term storage in a cryoprotectant at low temperature.

The term "master cell bank" refers to a collection of cryopreserved cells. Such a cell bank may comprise stem cells, non-stem cells (such as fibroblasts), and/or a mixture of stem cells and non-stem cells.

The term "extracellular vesicle" as used herein is a particle naturally released from virtually every cell type in the body that is surrounded by a phospholipid bilayer and cannot replicate. Extracellular vesicles contain distinct lipids, proteins, sugars, adhesion integrins, growth factors, receptors, cytokines, protease inhibitors, and nucleic acids that reflect their cells of origin. Extracellular vesicles include exosomes (generally ranging from 30-150 nm), microvesicles (generally ranging from 30 nm-2 µm), and apoptotic bodies (500 nm-2 µm).

The term "conditioned media" as used herein is the spent media harvested from cultured cells. It contains metabolites, growth factors, and extracellular matrix proteins secreted into the medium by the cultured cells. Examples may include metabolites such as glucose, amino acids, and nucleosides; growth factors such as interleukins, EGF (epidermal growth factor), and PDGF (platelet-derived growth factor); and matrix proteins such as collagen, fibronectin, and various proteoglycans. Fibroblasts are extremely heterogeneous multi-functional cells that play a role in wound healing, developmental processes, and tumor development. Fibroblasts are capable of producing and releasing into the culture media various immune modulators including peptide growth factors, cytokines, chemokines and inflammatory mediators.

This disclosure is not limited to the particular methodology, protocols, and reagents, etc., described herein and as such can vary. The terminology used herein is for the purpose of describing particular embodiments only, and is not intended to limit the scope of the present disclosure, which is defined solely by the claims. As used herein and in the claims, the singular forms include the plural reference and vice versa unless the context clearly indicates otherwise. Other than in the operating examples, or where otherwise indicated, all numbers expressing quantities of ingredients or reaction conditions used herein should be understood as modified in all instances by the term "about." All patents and other publications identified are expressly incorporated herein by reference for the purpose of describing and disclosing, for example, the methodologies described in such publications that might be used in connection with the present disclosure. These publications are provided solely for their disclosure prior to the filing date of the present application. Nothing in this regard should be construed as an admission that the inventors are not entitled to antedate such disclosure by virtue of prior disclosure or for any other reason. All statements as to the date or representation as to the contents of these documents is based on the information available to the applicants and does not constitute any admission as to the correctness of the dates or contents of these documents. Unless defined otherwise, all technical and scientific terms used herein have the same meaning as those commonly understood to one of ordinary skill in the art to which this disclosure pertains. Although any known methods, devices, and materials may be used in the practice or testing of the disclosure, the methods, devices, and materials in this regard are described herein.

II. Fibroblasts

Fibroblasts, modified fibroblasts, and/or products derived from fibroblasts are utilized herein to treat or prevent kidney failure caused by disease or under certain conditions. In some embodiments, the fibroblasts of the present disclosure are from an autologous source with respect to an individual subject to methods of the present disclosure. In some embodiments, the fibroblasts of the present disclosure are from an allogeneic source with respect to an individual subject to methods of the present disclosure. In some embodiments, the fibroblasts of the present disclosure are from a xenogeneic source with respect to an individual subject to methods of the present disclosure. The fibroblasts of the present disclosure may be from any source or tissue including fibroblasts derived from skin, adipose tissue, bone marrow, umbilical cord, Wharton's jelly, omentum, peripheral blood, mobilized peripheral blood, or a combination thereof. Mobilized peripheral blood may be obtained by administering to an individual a composition that generates mobilized peripheral blood, including G-CSF, GM-CSF, flt-3 ligand, plerixafor (including Mozobil™), hyperbaric oxygen, ozone therapy, or a combination thereof.

The fibroblasts of the disclosure, in some embodiments, may be cultured in a liquid media, and they may possess some or all of the following characteristics: (i) expression or production of the antigens CD105, CD90, CD73, CD44, extracellular vimentin, cyclin D2, Snail, E-cadherin, SOX-2, CD29, and/or WT1, but lacking hematopoietic markers CD45, CD34 and CD14 and MHC II; (ii) ability to differentiate into osteoblasts, adipocytes and/or chondrocytes; (iii) hypoimmunogenicity as observed by reduced ability to stimulate allogeneic T cell proliferation compared to epithelial cells; (iv) have active immune suppressive activity, such as determined by an ability to inhibit proliferation of an ongoing mixed lymphocyte reaction. In specific aspects, fibroblasts and MSCs are distinguishable from each other because MSCs do not express Oct-4, CD-34, KLF-4, Nanog, Sox-2, Rex-1, GDF-3, Stella, or possess enhanced expression of GDF-11. In specific embodiments, modified fibroblasts have one or more of the aforementioned characteristic(s), and/or products derived from fibroblasts come from fibroblasts that have one or more of the aforementioned characteristic(s).

The fibroblasts of the disclosure, when cultured in liquid media, may show upregulation of one or more genes involved in the cell cycle (e.g., cyclins and cyclin dependent kinases) and/or in DNA replication and/or purine metabolism when compared to standard or non-modified fibroblasts or mesenchymal stem cells. In particular embodiments, genes functionally active in cell adhesion/extracellular matrix (ECM)-receptor interaction, differentiation/development, TGF-β signaling and TSP-1-induced apoptosis are downregulated in the fibroblasts of the disclosure, when compared to standard or non-modified fibroblasts or mesenchymal stem cells. Specific examples of TGF-beta associated signaling genes, which are downregulated by the fibroblasts, include at least SMAD1, SMAD2, SMAD3, SMAD4, GITR, PD-L1, CD5, and/or CD31.

The fibroblasts of the disclosure may be cultured in media supplemented with platelet lysate (PL) and/or fetal calf serum (FCS), in some cases. In some embodiments, methods of producing fibroblasts that are renal reparative are encompassed. The starting material for the fibroblasts may be various tissues, and in one embodiment starting tissue is skin cells obtained from cosmetic surgery. In other embodiments, adipose tissue, bone marrow, placenta, umbilical cord, mobilized peripheral blood, Wharton's jelly, and/or omentum is isolated from healthy donors for harvesting of fibroblasts of the present disclosure. In specific cases, these donors are mammals, including at least humans. In one embodiment of the method of producing fibroblasts of the disclosure, the fibroblasts are cultured in tissue culture flasks between 2 and 10 days prior to washing non-adherent cells from the flask. Optionally, the number of days of culture of fibroblast cells prior to washing non-adherent cells is 2 to 3 days. In some cases, the fibroblasts are cultured in platelet lysate (PL) containing media. For example, 300 μL of fibroblasts may be cultured in 15 mL of PL supplemented medium in T75 or other adequate tissue culture vessels. After washing away the non-adherent cells, the adherent cells are also cultured in media that has been supplemented with platelet lysate. Thrombocytes are a well characterized human product that is widely used in clinics for individuals in need of blood supplement. Thrombocytes are known to produce a wide variety of factors, e.g. PDGF-BB, TGF-β, IGF-1, and VEGF. In one embodiment of the method of producing fibroblasts of the disclosure, an optimized preparation of PL is used. This optimized preparation of PL is made up of pooled platelet rich plasmas (PRPs) from at least 10 donors (to equalize for differences in cytokine concentrations) with a minimal concentration of $3 \times 10^9$ thrombocytes/mL.

In some embodiments of the disclosure, fibroblasts are cultured under conditions that allow for migration of said fibroblasts toward injured renal cells. This is analogous to studies that show MSC can home to hyaluronic acid in injured kidneys. For example, in one study, the role of CD44 and its major ligand, hyaluronic acid, in the trafficking of intravenously injected MSC in the glycerol-induced mouse model of acute renal failure (ARF). In vitro, hyaluronic acid promoted a dose-dependent migration of the stem cells that was inhibited by an anti-CD44 blocking monoclonal antibody. In vivo, stem cells injected into mice with ARF migrated to the injured kidney where hyaluronic acid expression was increased. Their presence correlated with morphological and functional recovery. Renal localization of the MSC was blocked by pre-incubation with the CD44 blocking antibody or by soluble hyaluronic acid. Stem cells derived from CD44 knockout mice did not localize to the injured kidney and did not accelerate morphological or functional recovery. Reconstitution by transfection of CD44 knockout stem cells with cDNA encoding wild-type CD44, but not a loss of function CD44 unable to bind hyaluronic acid, restored in vitro migration and in vivo localization of the cells to injured kidneys.

According to particular embodiments of the method of producing fibroblasts of the disclosure, fibroblasts are exposed to PL that was prepared either from pooled thrombocyte concentrates designed for human use (produced as TK5F from the blood bank at the University Clinic UKE Hamburg-Eppendorf, pooled from 5 donors) or from 7-13 pooled buffy coats after centrifugation with 200×g for 20 min. In particular cases, the PRP was aliquoted into small portions, frozen at −80 C., and thawed immediately before use to produce PL. PL-containing medium was prepared freshly for each cell feeding. In a particular embodiment, medium is used that contains alpha-MEM as basic medium supplemented with 5 IU Heparin/ml medium and 5% of freshly thawed PL. The method of producing fibroblasts of the disclosure may use a method to prepare PL that differs from others according to the thrombocyte concentration and centrifugation forces, in some cases. The composition of this PL is described in greater detail, below.

In one embodiment of the method of producing fibroblasts of the disclosure, the adherent cells are cultured in PL-supplemented media at 37° C. with approximately 5% $CO_2$ under hypoxic conditions. In certain aspects, the hypoxic conditions are an atmosphere of 5% $O_2$. In some situations, hypoxic culture conditions allow fibroblasts to grow more quickly. This allows for a reduction of days needed to grow the cells to 90-95% confluence. Generally, it reduces the growing time by about three days. In another embodiment of the method of producing fibroblasts of the disclosure, the adherent cells are cultured in PL-supplemented media at 37° C. with approximately 5% $CO_2$ under normoxic conditions, i.e. wherein the $O_2$ concentration is the same as atmospheric $O_2$, at approximately 20.9%. In certain cases, the adherent cells are cultured between 9 and 12 days; being fed every 4 days with PL-supplemented media. In one embodiment of the method of producing fibroblasts of the disclosure, the adherent cells are grown to between 70 and 90% confluence. In specific cases, once this level of confluence is reached, the cells are enzymatically detached, for example using trypsin.

In certain embodiments, the population of cells that is isolated from the plate is between 85-95% fibroblasts. In other embodiments, the fibroblasts are greater than 95%, 96%, 97%, 98%, or 99% of the isolated cell population.

In another embodiment of the method of producing fibroblasts of the disclosure, the cells are frozen after they are released from the tissue culture plate. Freezing may be performed in a step-wise manner in a physiologically acceptable carrier, 5-10% human serum albumin and 10% DMSO. Thawing is also performed in a step-wise manner. In specific cases, when thawed, the frozen fibroblasts of the disclosure are diluted 4:1 to reduce the DMSO concentration especially when the fibroblasts are to be administered intraarterially. In this case, frozen fibroblasts of the disclosure are thawed quickly at 37° C. and administered intravenously without any dilution or washings. The serum albumin may be human serum albumin.

For the practice of the disclosure, in another embodiment, the fibroblast cells are cryopreserved in aliquots of approximately $10^6$-$10^8$ cells in 50 mL of physiologically acceptable carrier and serum albumin (HSA), such as prior to use. In another embodiment of the method of producing fibroblasts of the disclosure, the cells are cryopreserved in aliquots of $10^6$-$10^8$ cells per kg of individual's body weight, in 50 mL of physiologically acceptable carrier and human serum albumin (HSA). In one aspect of these embodiments, when a therapeutic dose is being prepared, the appropriate number of cryovials is thawed in order to provide the appropriate number of cells for the therapeutic dose. In specific cases, after DMSO is diluted from the thawed cells, the number of cryovials chosen is placed in a sterile infusion bag with 5% human serum albumin. Once in the bag, the fibroblasts do not aggregate and viability remains greater than 95% for at least 6 hours even when the fibroblasts are stored at room temperature. This provides ample time to administer the fibroblasts of the disclosure to a patient in an operating room. Optionally, the physiologically acceptable carrier is PlasmaLyte A. In particular cases, the albumin is present at a concentration of 5% w/v. Suspending $10^6$-$10^8$ fibroblasts of the disclosure in greater than 40 mL of physiological carrier is critical to their biological activity. If the cells are suspended in lower volumes, the cells are prone to aggregation. Administration of aggregated fibroblasts to mammalian subjects has resulted in cardiac infarction. Thus, in some embodiments it is useful that non-aggregated fibroblasts be administered according to the methods of the disclosure. The presence of albumin may also be critical because it prevents aggregation of the fibroblasts and also prevents the cells from sticking to plastic containers that the cells pass through when administered to subjects.

In another embodiment of the method of producing fibroblasts of the disclosure, a closed system is used for generating and expanding the fibroblast of the disclosure from bone marrow of normal donors. This closed system may be a device to functionally expand cells ex vivo. In one specific embodiment, the closed system comprises: 1. a central expansion unit preferably constructed similarly to bioreactors with compressed (within a small unit), but extended growth surfaces; 2. media bags that can be sterilely connected to the expansion unit (e.g. by welding tubes between the unit and the bags) for cell feeding; and 3. electronic devices to operate automatically the medium exchange, gas supply and temperature. The advantages of the closed system in comparison to conventional flask tissue culture are the construction of a functionally closed system, i.e. the cell input and media bags are sterile welded to the system. This minimizes the risk of contamination with external pathogens and therefore may be highly suitable for clinical applications. Furthermore, this system can be constructed in a compressed form with consistently smaller cell culture volumes but preserved growth area. The smaller volumes allow the cells to interact more directly with each other which creates a culture environment that is more comparable to the in vivo situation of the bone marrow niche. Also the closed system saves costs for the media and the whole expansion process.

The construction of the closed system may involve two sides: the cells are grown inside of multiple fibers with a small medium volume. In some embodiments, the culture media comprises growth factors for growth stimulation, and medium without expensive supplements is passed outside the fibers. The fibers are designed to comprise nanopores for a constant removal of potentially growth-inhibiting metabolites while important growth-promoting factors are retained in the growth compartment.

In certain embodiments of the method of producing fibroblast of the disclosure, the closed system is used in conjunction with a medium for expansion of fibroblast that does not contain any animal proteins, e.g., fetal calf serum (FCS). FCS has been connected with adverse effects after in vivo application of FCS-expanded cells, e.g., formation of anti-FCS antibodies, anaphylactic or arthus-like immune reactions or arrhythmias after cellular cardioplasty. FCS may introduce unwanted animal xenogeneic antigens, viral, prion and zoonose contaminations into cell preparations making new alternatives necessary.

In some embodiments, fibroblast cells are isolated from a sample or biopsy of bodily tissue by enzymatic digestion, mechanical separation, filtration, centrifugation and combinations thereof. The number and quality of the isolated fibroblast cells can vary depending, e.g., on the quality of the tissue used, the compositions of perfusion buffer solutions, and the type and concentration of enzyme. Frequently used enzymes include, but are not limited to, collagenase, pronase, trypsin, dispase, hyaluronidase, thermolysin and pancreatin, and combinations thereof. Collagenase is most commonly used, often prepared from bacteria (e.g., from *Clostridium histolyticum*), and may often consist of a poorly purified blend of enzymes, which may have inconsistent enzymatic action. Some of the enzymes exhibit protease activity, which may cause unwanted reactions affecting the quality and quantity of viable/healthy fibroblast cells. It is understood by those of skill in the art to use enzymes of sufficient purity and quality to obtain viable fibroblast cell populations.

The methods of the disclosure comprise culturing the fibroblast cells obtained from human tissue samples. In particular embodiments, the populations of fibroblast cells are plated onto a substrate. In the present disclosure, fibroblasts are plated onto a substrate which allows for adherence of cells thereto. This may be carried out, e.g., by plating the cells in a culture plate which displays one or more substrate surfaces compatible with cell adhesion. When the said one or more substrate surfaces contact the suspension of cells (e.g., suspension in a medium) introduced into the culture system, cell adhesion between the cells and the substrate surfaces may ensue. Accordingly, the term "plating onto a substrate which allows adherence of cells thereto" refers to introducing cells into a culture system that features at least one substrate surface that is generally compatible with adherence of cells thereto, such that the plated cells can contact the substrate surface.

General principles of maintaining adherent cell cultures are well-known in the art. As appreciated by those skilled in the art, the fibroblast cells may be counted in order to facilitate subsequent plating of the cells at a desired density. Where, as in the present disclosure, the cells after plating may primarily adhere to a substrate surface present in the culture system (e.g., in a culture vessel), the plating density may be expressed as number of cells plated per $mm^2$ or $cm^2$ of the said substrate surface. In practicing the disclosure, after plating of the fibroblasts, the cell suspension is left in contact with the adherent surface to allow for adherence of cells from the cell population to the substrate. In contacting fibroblasts to the adherent substrate, the cells may be advantageously suspended in an environment comprising at least a medium, in the methods of the disclosure typically a liquid medium, which supports the survival and/or growth of the cells. The medium may be added to the system before, together with or after the introduction of the cells thereto. The medium may be fresh, i.e., not previously used for culturing of cells, or may comprise at least a portion which has been conditioned by prior culturing of cells therein, e.g., culturing of the cells which are being plated or antecedents thereof, or culturing of cells more distantly related to or unrelated to the cells being plated.

The medium may be a suitable culture medium as described elsewhere in this specification. In some cases, the composition of the medium may have the same features, may be the same or substantially the same as the composition of medium used in the ensuing steps of culturing the attached cells. Otherwise, the medium may be different. In some embodiments, the cells from the fibroblast cell population or from tissue explants of the present disclosure, which have adhered to the substrate, preferably in the environment, are subsequently cultured for at least 7 days, for at least 8 days, or for at least 9 days, for at least 10 days, at least 11, or at least 12 days, at least 13 days or at least 14 days, for at least 15 days, for at least 16 days or for at least 17 days, or even for at least 18 days, for at least 19 days or at least 21 days or more. The term "culturing" is common in the art and broadly refers to maintenance and/or growth of cells and/or progeny thereof.

In some embodiments, the fibroblast cells may be cultured for at least between about 10 days and about 40 days, for at least between about 15 days and about 35 days, for at least between about 15 days and 21 days, such as for at least about 15, 16, 17, 18, 19 or 21 days. In some embodiments, the fibroblasts of the disclosure may be cultured for no longer than 60 days, or no longer than 50 days, or no longer than 45 days. The tissue explants and fibroblasts may be cultured in the presence of a liquid culture medium. Typically, the medium will comprise a basal medium formulation as known in the art. Many basal media formulations can be used to culture fibroblasts herein, including but not limited to Eagle's Minimum Essential Medium (MEM), Dulbecco's Modified Eagle's Medium (DMEM), alpha modified Minimum Essential Medium (alpha-MEM), Basal Medium Essential (BME), Iscove's Modified Dulbecco's Medium (IMDM), BGJb medium, F-12 Nutrient Mixture (Ham), Liebovitz L-15, DMEM/F-12, Essential Modified Eagle's Medium (EMEM), RPMI-1640, and modifications and/or combinations thereof. Compositions of the above basal media are generally known in the art and it is within the skill of one in the art to modify or modulate concentrations of media and/or media supplements as necessary for the fibroblasts cultured. In some embodiments, a culture medium formulation may be explants medium (CEM) which is composed of IMDM supplemented with 10% fetal bovine serum (FBS, Lonza), 100 U/ml penicillin G, 100 .mu.g/ml streptomycin and 2 mmol/L L-glutamine (Sigma-Aldrich). Other embodiments may employ further basal media formulations, such as chosen from the ones above.

For use in the fibroblast culture, media can be supplied with one or more further components. For example, additional supplements can be used to supply the cells with the necessary trace elements and substances for optimal growth and expansion. Such supplements include insulin, transferrin, selenium salts, and combinations thereof. These components can be included in a salt solution such as, but not limited to, Hanks' Balanced Salt Solution (HBSS), Earle's Salt Solution. Further antioxidant supplements may be added, e.g., beta-mercaptoethanol. While many media already contain amino acids, some amino acids may be supplemented later, e.g., L-glutamine, which is known to be less stable when in solution. A medium may be further supplied with antibiotic and/or antimycotic compounds, such as, typically, mixtures of penicillin and streptomycin, and/or other compounds, exemplified but not limited to, amphotericin, ampicillin, gentamicin, bleomycin, hygromycin, kanamycin, mitomycin, mycophenolic acid, nalidixic acid, neomycin, nystatin, paromomycin, polymyxin, puromycin, rifampicin, spectinomycin, tetracycline, tylosin, and zeocin. Also contemplated is supplementation of cell culture medium with mammalian plasma or sera. Plasma or sera often contain cellular factors and components that are necessary for viability and expansion. The use of suitable serum replacements is also contemplated (e.g., FBS).

In some embodiments, the fibroblasts of the present disclosure are modified, such as by exposure to a composition, to enhance the ability of the fibroblasts to suppress the production of TGF-beta in Th3 cells. The modification of the fibroblasts may be monitored by assessing the inhibited production of TGF-beta from Th3 cells subsequent to cell to cell contact between modified fibroblasts and Th3 cells. The composition for modifying fibroblasts may comprise oxytocin, in specific cases. In some embodiments, the fibroblasts are exposed to the composition, such as oxytocin, for a period between approximately 1 minute to approximately 4 weeks, or between approximately 2 hours to approximately 1 week, or between approximately 24 hours to approximately 72 hours. The fibroblasts may be exposed to oxytocin at a concentration ranging between approximately 10 nM to approximately 10 µM, or between approximately 100 nM to approximately 1 µM.

As described, the present inventors have identified that by culturing tissue explants and fibroblast cells for time durations as defined above, and in at least some cases using media compositions as described above, a progenitor or fibroblasts of the disclosure emerges and proliferates. In some embodiments, fibroblast cells of the present disclosure are identified and characterized by their expression of specific marker proteins, such as cell-surface markers. Detection and isolation of these cells can be achieved, e.g., through flow cytometry, ELISA, and/or magnetic beads. Reverse-transcription polymerase chain reaction (RT-PCR) can also be used to monitor changes in gene expression in response to differentiation. Methods for characterizing fibroblasts the present disclosure are provided herein. In certain embodiments, the marker proteins used to identify and characterize the fibroblasts are selected from the group consisting of c-Kit, Nanog, Sox2, Hey1, SMA, Vimentin (including intracellular or extracellular vimentin), Cyclin D2, Snail, E-cadherin, Nkx2.5, GATA4, CD105, CD90, CD29, CD73, Wt1, CD34, CD45, and a combination thereof.

III. Kidney Disease

Certain embodiments of the present disclosure concern the treatment or prevention of one or more kidney diseases in an individual. As used herein, "kidney disease" may refer to any condition that reduces the normal function of the kidney and/or changes the physiology of the kidney. The normal function of the kidney comprises at least: regulation of fluid volume, regulation of osmolarity, regulation of ion concentrations (such as salt concentrations), regulation of physiological pH, filtration of wastes and toxins from the blood, production of hormones, generation of urine, regulation of blood pressure, or a combination thereof.

Reduction in normal kidney function may or may not be monitored by any means known in the art, including measuring certain biomarkers either in blood samples or urine samples from an individual of the present disclosure. Such biomarkers include, but are not limited to, creatinine, albumin, blood urea nitrogen (BUN), cystatin c, beta-trace protein (BTP), podocalyxin, nephrin, alpha 1-microglobulin, beta 2-microglobulin, glutathione s-transferase, interleukin-18, kidney injury molecule-1 (KIM-1), liver-type fatty acid-binding protein, netrin-1, neutrophil gelatinase-associated lipocalcin (NGAL), n-acetyl-beta-d-glucosaminidase (NAG), sodium, potassium, calcium, bicarbonate, pH, red blood cell count, lymphocytes, eosinophils, casts, ADAMTS13, ANCA, heavy chain immunoglobulins, light chain immunoglobulins, or a combination thereof. Changes in levels of the biomarkers from a baseline or measurements outside of a normal range, as defined by the art, may indicate reduction in normal kidney function. Reduction in normal kidney function may be measured by calculating the glomerular filtration rate (GFR), estimated GFR (eGFR), urine albumin to creatinine ratio (ACR), urine protein to creatinine ratio (uPCR), total urine protein (including 24 hour urine protein). Changes in measurements from a baseline or measurements outside of a normal range, as defined by the art, may indicate reduction in normal kidney function. Changes in physiology of the kidney may be measured by imaging the kidney, such as by ultrasound and/or CT scan. A biopsy of the kidney may or may not be taken to assess for signs of one or more kidney diseases.

The disease may affect one or both kidneys in an individual and may cause symptoms in the individual (e.g., blood in your urine, foamy urine, need to urinate more frequently, fatigue, puffy eyes, swollen ankles and/or feet, muscle cramping, poor appetite, dry and itchy skin, nausea, vomiting, sleep problems, decreased mental sharpness, and so forth, or be asymptomatic. The kidney disease may be mediated by any cause including being immune-mediated, infection-mediated, metabolism-mediated, hormone-mediated, genetically-mediated, or mediated by any other biological process.

The kidney disease of the present disclosure may be directly or indirectly related to exposure, accidentally or intentionally, of one or more nephrotoxic compositions or agents. Nephrotoxic compositions or agents include, but are not limited to, chemotherapies, radiation, immune-modulating compositions or agents, non-steroid anti-inflammatory drugs (NSAIDs), antibiotics, antifungals, antivirals, diuretics, beta blockers, ACE inhibitors, vasodilators, cyclosporins, steroids, narcotics, or any other composition and/or agent that may induce nephrotoxicity.

In certain embodiments, the kidney disease of the present disclosure may be acute kidney injury, acute proliferative glomerulonephritis, adenine phosphoribosyltransferase deficiency, alabama rot, Alport syndrome, analgesic nephropathy, autosomal dominant polycystic kidney disease, autosomal recessive polycystic kidney disease, balkan endemic nephropathy, bardoxolone methyl, benign nephrosclerosis, bright's disease, cardiorenal syndrome, CFHR5 nephropathy, chronic kidney disease, chronic kidney disease-mineral and bone disorder, congenital nephrotic syndrome, conorenal syndrome, contrast-induced nephropathy, cystic kidney disease, dent's disease, diabetic nephropathy, diffuse proliferative nephritis, distal renal tubular acidosis, diuresis, EAST syndrome, end stage renal disease, Epstein syndrome, Fanconi syndrome, fechtner syndrome, focal proliferative nephritis, focal segmental glomerulosclerosis, fraley syndrome, galloway mowat syndrome, gitelman syndrome, glomerulocystic kidney disease, glomerulopathy, goodpasture syndrome, hematologic diseases information service, high anion gap metabolic acidosis, HIV-associated nephropathy, horseshoe kidney, hydronephrosis, hyperkalemia, hypernatremia, hypertensive kidney disease, hyponatremia, IgA nephropathy, interstitial nephritis, juvenile nephronophthisis, kidney cancer, kidney stone disease, Lightwood-Albright syndrome, lupus nephritis, malarial nephropathy, medullary cystic kidney disease, medullary sponge kidney, membranous glomerulonephritis, mesoamerican nephropathy, milk-alkali syndrome, minimal mesangial glomerulonephritis, multicystic dysplastic kidney, nephritis, nephrocalcinosis, nephrogenic diabetes insipidus, nephromegaly, nephroptosis, nephrosis, nephrotic syndrome, nutcracker syndrome, papillorenal syndrome, phosphate nephropathy, polycystic kidney disease, primary hyperoxaluria, proximal renal tubular acidosis, pyelonephritis, pyonephrosis, rapidly progressive glomerulonephritis, renal agenesis, renal angina, renal artery stenosis, renal cyst, renal ischemia, renal osteodystrophy, renal papillary necrosis, renal tubular acidosis, renal vein thrombosis, secondary hypertension, serpentine fibula-polycystic kidney syndrome, shunt nephritis, sickle cell nephropathy, tetracapsuloides, thin basement membrane disease, transplant glomerulopathy, tubulointerstitial nephritis and uveitis, tubulopathy, uremia, uremic frost, wunderlich syndrome, or a combination thereof.

IV. Therapeutic or Preventative Administration

Certain embodiments of the present disclosure concern the administration of an effective amount of fibroblasts to an individual having, or at risk of having, kidney disease, including any kidney disease or loss of kidney function described herein. The fibroblasts may be administered in any suitable manner, including intra-arterially and/or intravenously, merely as examples. In some embodiments, the fibroblasts are administered to an individual of the present disclosure therapeutically or prophylactically. The fibroblasts may be administered to the individual at the onset or initial diagnosis of the kidney disease. The fibroblasts may be administered at any time before or after the onset or initial diagnosis of the kidney disease. The fibroblasts may be administered less than 24 hours or less than 48 hours after the onset or diagnosis of the kidney disease. The fibroblasts may be administered more than 24 hours or more than 48 hours after the onset or diagnosis of the kidney disease. The fibroblasts may be administered between 24 to 48 hours after the onset or diagnosis of the kidney disease. The fibroblasts may be administered approximately 24, 26, 28, 30, 32, 34, 36, 38, 40, 42, 44, 46, or 48 hours after the onset or diagnosis of the kidney disease. In some embodiments, the fibroblasts are administered within 1, 2, 3, 4, 5, 6, 7, days or within 1, 2, 3, or 4 weeks or 1, 2, 3, 4, 5, or 6 months after onset of a symptom of kidney disease.

In some embodiments, an individual of the present disclosure is administered a prophylactically or therapeutically effective amount of fibroblasts of the present disclosure. The prophylactically or therapeutically effective amount of fibroblasts may be between approximately $7 \times 10^5$ cells/kg of individual's body weight and approximately $7 \times 10^6$ cells/kg of individual's body weight. In some embodiments, the prophylactically or therapeutically effective amount of fibroblasts is between about approximately $2 \times 10^6$ cells/kg of individual's body weight and approximately $5 \times 10^6$ cells/kg of individual's body weight. In some embodiments, the prophylactically or therapeutically effective amount of fibroblasts approximately $2 \times 10^6$ cells/kg of individual's body weight.

Morigi et al used a model of renal injury induced in mice by the anticancer agent cisplatin was chosen. Injection of mesenchymal stem cells of male bone marrow origin remarkably protected cisplatin-treated syngeneic female mice from renal function impairment and severe tubular injury. Y chromosome-containing cells localized in the context of the tubular epithelial lining and displayed binding sites for *Lens culinaris* lectin, indicating that mesenchymal stem cells engraft the damaged kidney and differentiate into tubular epithelial cells, thereby restoring renal structure and function. Mesenchymal stem cells markedly accelerated tubular proliferation in response to cisplatin-induced damage, as revealed by higher numbers of Ki-67-positive cells within the tubuli with respect to cisplatin-treated mice that were given saline. Hematopoietic stem cells failed to exert beneficial effects. In the context of the current disclosure, in one embodiment, fibroblasts are used to induce de novo differentiation of cells into tubular epithelial cells, as well as to protect from chemotherapy induced kidney damage.

In another study, the effect of mesenchymal stem cell (MSCs) infusion on the recovery from ARF induced by intramuscle injection of glycerol in C57/BL6 mice was assessed. In this model, ARF is associated with an extensive necrosis of tubular epithelial cells due to myoglobin- and hemoglobin-induced injury. MSCs were obtained from bone marrow of transgenic mice expressing green fluorescent protein (GFP). MSC GFP-positive cells (MSC-GFP(+)) injected intravenously homed to the kidney of mice with glycerol-induced ARF but not to the kidney of normal mice. MSC-GFP(+) localized in the context of the tubular epithelial lining and expressed cytokeratin, indicating that MSCs engrafted in the damaged kidney, differentiated into tubular epithelial cells and promoted the recovery of morphological and functional alterations. Moreover, MSCs enhanced tubular proliferation as detected by the increased number of proliferating cell nuclear antigen (PCNA) positive cells. A significant contribution of the engrafted MSCs in the regeneration of tubular epithelial cells was shown by the presence of a consistent number of GFP(+) tubular cells 21 days after the induction of injury.

Similarly to MSCs, fibroblasts of the disclosure are capable of treating kidney damage both through direct differentiation inducing mechanisms, as well as through indirect mechanisms. Indirect mechanisms include protection from apoptosis, production of growth factors that stimulate endogenous progenitors, and reduction of fibrosis. In one study, intracarotid administration of MSC (approximately $10^6$/animal) either immediately or 24 h after renal ischemia resulted in significantly improved renal function, higher proliferative and lower apoptotic indexes, as well as lower renal injury and unchanged leukocyte infiltration scores. Such renoprotection was not obtained with syngeneic fibroblasts. Using in vivo two-photon laser confocal microscopy, fluorescence-labeled MSC were detected early after injection in glomeruli, and low numbers attached at microvasculature sites. However, within 3 days of administration, none of the administered MSC had differentiated into a tubular or endothelial cell phenotype. At 24 h after injury, expression of proinflammatory cytokines IL-1beta, TNF-alpha, IFN-gamma, and inducible nitric oxide synthase was significantly reduced and that of anti-inflammatory IL-10 and bFGF, TGF-alpha, and Bcl-2 was highly upregulated in treated kidneys.

In another study, kidney ischemia reperfusion injury was induced by clamping the bilateral pedicles for 60 minutes. Mesenchymal stem cells (MSC), which had been isolated and cultivated in plastic flasks, were administered to mice 6 hours after injury. Real-time polymerase chain reaction was used to quantify interleukin (IL)-4 and IL-1beta mRNAs. Proliferative nuclear cell antigen (PCNA) was used to calculate tubular regeneration. It was shown that administration of MSC attenuated renal injury; serum creatinine and plasma urea levels were significantly reduced 24 hours after reperfusion. PCNA immunohistochemistry showed that regeneration occurred faster in renal tissues of animals that received MSC than in tissues of control animals. Analyses of cytokine expression in renal tissue demonstrated a greater level of anti-inflammatory cytokines in MSC-treated animals. Others studies regarding use of cellular therapies for treatment of kidney failure are incorporated by reference to provide guidance on dosage and means of administration.

In some embodiments of the disclosure, correction of endothelial progenitor cell (EPC) deficiency is performed prior to administration of fibroblasts. It is known that patients with chronic renal failure (CRF) have such deficiencies. For example, in one study, EPCs were isolated from CRF patients on maintenance hemodialysis (n=44) and from a normal control group (n=30). CRF patients showed markedly decreased numbers of EPC (44.6%) and colonies (75.3%) when compared with the controls (P<0.001). These findings were corroborated by 30.5% decrease in EPC migratory function in response to vascular endothelial growth factor (VEGF) (P=0.040) and 48.8% decrease in EPC incorporation into human umbilical vein endothelial cells (HUVEC) (P<0.001). In addition, Framingham's risk factor score of both CRF (r=−0.461, P=0.010) and normal group (r=−0.367, P=0.016) significantly correlated with the numbers of EPC. Indeed, the number of circulating EPC was significantly lower in CRF patients than in normal group under the same burden of risk factors (P<0.001). A significant correlation was also observed between dialysis dose (Kt/V) and EPC incorporation into HUVEC (r=0.427, P=0.004).

It is believed that after kidney injury, surviving renal epithelial cells undergo a program of dedifferentiation and take on mesenchymal characteristics. These cells proliferate to restore the integrity of the denuded basement membrane, and subsequently redifferentiate into a functional epithelium. The process of dedifferentiation and redifferentiation is dependent on EGF, accordingly, in one embodiment, administered fibroblasts regenerate injured kidneys through their production of EGF. Accordingly, in one embodiment of the disclosure, regenerative fibroblasts are therapeutically useful in the treatment of kidney failure by assisting processes associated with the dedifferentiation and redifferentiation of renal cells. An alternative possibility is that a minority of surviving intratubular cells possess stem cell properties and selectively proliferate after damage to neighboring cells. In such embodiments, the disclosure encompasses that regenerative fibroblasts act as cells capable of differentiating into renal cells and/or supporting existing cells.

In one embodiment, fibroblasts, modified fibroblasts, products derived from fibroblasts and/or fibroblast-conditioned media is used in combination with one or more immune suppressive agents to augment its activity at reducing inflammation associated with kidney failure and augmented endothelin release. It will be known to one of skill in the art to choose from various immune suppressive agents. For example, some immune suppressive agents, such as anti-CD52 antibodies, may be used when a systemic depletion of T and B cells is desired, whereas agents that concurrently stimulate T regulatory cell activity, such as Rapamycin, may be desired in other cases. The skilled practitioner is guided to several agents that are known in the art for causing immune suppression, which include cyclosporine, rapamycin, campath-1H, ATG, Prograf, anti IL-2r, MMF, FTY, LEA, cyclosporin A, diftitox, denileukin, levamisole, azathioprine, brequinar, gusperimus, 6-mercaptopurine, mizoribine, rapamycin, tacrolimus (FK-506), folic acid analogs (e.g., denopterin, edatrexate, methotrexate, piritrexim, pteropterin, Tomudex®, and trimetrexate), purine analogs (e.g., cladribine, fludarabine, 6-mercaptopurine, thiamiprine, and thiaguanine), pyrimidine analogs (e.g., ancitabine, azacitidine, 6-azauridine, carmofur, cytarabine, doxifluridine, emitefur, enocitabine, floxuridine, fluorouracil, gemcitabine, and tegafur) fluocinolone, triaminolone, anecortave acetate, fluorometholone, medrysone, prednislone, etc. In another embodiment, the use of fibroblast conditioned media may be used to potentiate an existing anti-inflammatory agent. Anti-inflammatory agents may comprise one or more agents including NSAIDs, interleukin-1 antagonists, dihydroorotate synthase inhibitors, p38 MAP kinase inhibitors, TNF-.alpha. inhibitors, TNF-alpha sequestration agents, and methotrexate. More specifically, anti-inflammatory agents may comprise one or more of, e.g., anti-TNF-.alpha., lysophylline, alpha 1-antitrypsin (AAT), interleukin-10 (IL-10), pentoxyfilline, COX-2 inhibitors, 21-acetoxypregnenolone, alclometasone, algestone, amcinonide, beclomethasone, betamethasone, budesonide, chloroprednisone, clobetasol, clobetasone, clocortolone, cloprednol, corticosterone, cortisone, cortivazol, deflazacort, desonide, desoximetasone, dexamethasone, diflorasone, diflucortolone, difluprednate, enoxolone, fluazacort, flucloronide, flumethasone, flunisolide, fluocinolone acetonide, fluocinonide, fluocortin butyl, fluocortolone, fluorometholone, fluperolone acetate, fluprednidene acetate, fluprednisolone, flurandrenolide, fluticasone propionate, formocortal, halcinonide, halobetasol propionate, halometasone, halopredone acetate, hydrocortamate, hydrocortisone, loteprednol etabonate, mazipredone, medrysone, meprednisone, methylprednisolone, mometasone furoate, paramethasone, prednicarbate, prednisolone, prednisolone 25-diethylamino-acetate, prednisolone sodium phosphate, prednisone, prednival, prednylidene, rimexolone, tixocortol, triamcinolone, triamcinolone acetonide, triamcinolone benetonide, triamcinolone hexacetonide, aminoarylcarboxylic acid derivatives (e.g., enfenamic acid, etofenamate, flufenamic acid, isonixin, meclofenamic acid, mefenamic acid, niflumic acid, talniflumate, terofenamate, tolfenamic acid), arylacetic acid derivatives (e.g., aceclofenac, acemetacin, alclofenac, amfenac, amtolmetin guacil, bromfenac, bufexamac, cinmetacin, clopirac, diclofenac sodium, etodolac, felbinac, fenclozic acid, fentiazac, glucametacin, ibufenac, indomethacin, isofezolac, isoxepac, lonazolac, metiazinic acid, mofezolac, oxametacine, pirazolac, proglumetacin, sulindac, tiaramide, tolmetin, tropesin, zomepirac), arylbutyric acid derivatives (e.g., bumadizon, butibufen, fenbufen, xenbucin), arylcarboxylic acids (e.g., clidanac, ketorolac, tinoridine), arylpropionic acid derivatives (e.g., alminoprofen, benoxaprofen, bermoprofen, bucloxic acid, carprofen, fenoprofen, flunoxaprofen, flurbiprofen, ibuprofen, ibuproxam, indoprofen, ketoprofen, loxoprofen, naproxen, oxaprozin, piketoprolen, pirprofen, pranoprofen, protizinic acid, suprofen, tiaprofenic acid, ximoprofen, zaltoprofen), pyrazoles (e.g., difenamizole, epirizole), pyrazolones (e.g., apazone, benzpiperylon, feprazone, mofebutazone, morazone, oxyphenbutazone, phenylbutazone, pipebuzone, propyphenazone, ramifenazone, suxibuzone, thiazolinobutazone), salicylic acid derivatives (e.g., acetaminosalol, aspirin, benorylate, bromosaligenin, calcium acetylsalicylate, diflunisal, etersalate, fendosal, gentisic acid, glycol salicylate, imidazole salicylate, lysine acetylsalicylate, mesalamine, morpholine salicylate, 1-naphthyl salicylate, olsalazine, parsalmide, phenyl acetylsalicylate, phenyl salicylate, salacetamide, salicylamide o-acetic acid, salicylsulfuric acid, salsalate, sulfasalazine), thiazinecarboxamides (e.g., ampiroxicam, droxicam, isoxicam, lornoxicam, piroxicam, tenoxicam), epsilon.-acetamidocaproic acid, s-adenosylmethionine, 3-amino-4-hydroxybutyric.acid, amixetrine, bendazac, benzydamine, .alpha.-bisabolol, bucolome, difenpiramide, ditazol, emorfazone, fepradinol, guaiazulene, nabumetone, nimesulide, oxaceprol, paranyline, perisoxal, proquazone, superoxide dismutase, tenidap, zileuton, candelilla wax, alpha bisabolol, aloe vera, Manjistha, Guggal, kola extract, chamomile, sea whip extract, glycyrrhetic acid, glycyrrhizic acid, oil soluble licorice extract, monoammonium glycyrrhizinate, monopotassium glycyrrhizinate, dipotassium glycyrrhizinate, 1-beta-glycyrrhetic acid, stearyl glycyrrhetinate, and/or 3-stearyloxy-glycyrrhetinic acid.

V. Methods of Treatment

Embodiments of the disclosure include methods of treating an individual for a medical condition by providing to the individual a prophylactically or therapeutically effective amount of fibroblasts, modified fibroblasts, products derived from fibroblasts, and/or conditioned media. In particular embodiments, the individual has a kidney disease, including chronic kidney disease or acute kidney injury, or is at risk for having a kidney disease as compared to the general population. The individual may be at risk for having one or more risk factors, such as a personal or family history, one or more genetic markers, exposure to nephrotoxic agents, and so forth. The compositions of the disclosure may be used for in vivo, in vitro, or ex vivo administration.

The therapy provided herein may comprise administration of a combination of therapeutic compositions, such as a first kidney disease therapy (e.g., fibroblasts, modified fibroblasts, and/or products derived from fibroblasts) and one or more additional kidney disease therapies. The therapies may be administered in any suitable manner known in the art. For example, the first and one or more additional kidney disease therapies may be administered sequentially (at different times) or concurrently (at the same time or approximately the same time; also "simultaneously" or "substantially simultaneously"). In some embodiments, the first and one or more additional kidney disease therapies may be administered in a separate composition. In some embodiments, the first and one or more additional kidney disease therapies may be in the same composition. The different therapies may be administered in one composition or in more than one composition, such as 2 compositions, 3 compositions, or 4 compositions. Various combinations of the agents may be employed.

A. Carriers

In some embodiments, pharmaceutical compositions of the present disclosure comprise an effective amount of one or more compositions comprising fibroblasts, modified fibroblasts, and/or products derived from fibroblasts, dissolved or dispersed in a pharmaceutically acceptable carrier. The phrases "pharmaceutical" and "pharmacologically acceptable" and used interchangeably herein refer to molecular entities and compositions that do not produce an adverse, allergic or other untoward reaction when administered to a subject, such as, for example, a human, as appropriate, and do not interfere with the therapeutic methods of the disclosure. The preparation of a pharmaceutical composition that comprises fibroblasts, modified fibroblasts, and/or products derived from fibroblasts, or additional active ingredient(s), will be known to those of skill in the art in light of the present disclosure, as exemplified by Remington: The Science and Practice of Pharmacy, 21st Ed. Lippincott Williams and Wilkins, 2005, specifically incorporated by reference herein in its entirety. Moreover, for administration to a subject, it will be understood that preparations should meet sterility, pyrogenicity, general safety, and purity standards as required by FDA Office of Biological Standards.

As used herein, "pharmaceutically acceptable carrier" includes any and all solvents, dispersion media, coatings, surfactants, antioxidants, preservatives (e.g., antibacterial agents, antifungal agents), isotonic agents, absorption delaying agents, salts, preservatives, drugs, drug stabilizers, gels, binders, excipients, disintegration agents, lubricants, sweetening agents, flavoring agents, dyes, such like materials and combinations thereof, as would be known to one of ordinary skill in the art (see, for example, Remington's Pharmaceutical Sciences, 18th Ed. Mack Printing Company, 1990, pp. 1289-1329, specifically incorporated by reference herein in its entirety). Except insofar as any conventional carrier is incompatible with the active ingredient, its use in the pharmaceutical compositions is contemplated. The compositions comprising fibroblasts, modified fibroblasts, and/or products derived from fibroblasts, may comprise different types of carriers depending on whether it is to be administered in solid, liquid or aerosol form, and whether it needs to be sterile for such routes of administration, such as injection.

Further in accordance with the present disclosure, the composition of the present disclosure suitable for administration may be provided in a pharmaceutically acceptable carrier with or without an inert diluent. The carrier should be assimilable and includes liquid, semi-solid, i.e., pastes, or solid carriers. Except insofar as any conventional media, agent, diluent or carrier is detrimental to the recipient or to the therapeutic effectiveness of a composition contained therein, its use in practicing the methods of the present disclosure is appropriate. Examples of carriers or diluents include fats, oils, water, saline solutions, lipids, liposomes, resins, binders, fillers, alcohols, and the like, or combinations thereof. The composition may also comprise various antioxidants to retard oxidation of one or more component. Additionally, the prevention of the action of microorganisms can be brought about by preservatives such as various antibacterial and antifungal agents, including but not limited to parabens (e.g., methylparabens, propylparabens), chlorobutanol, phenol, sorbic acid, thimerosal or combinations thereof.

In accordance with the present disclosure, the composition is combined with the carrier in any convenient and practical manner, i.e., by solution, suspension, emulsification, admixture, encapsulation, absorption and the like. Such procedures are routine for those skilled in the art. The compositions comprising fibroblasts, modified fibroblasts, and/or products derived from fibroblasts, may be lyophilized.

In a specific embodiment of the present disclosure, the composition is combined or mixed thoroughly with a semi-solid or solid carrier. The mixing can be carried out in any convenient manner such as grinding. Stabilizing agents can be also added in the mixing process in order to protect the composition from loss of therapeutic activity, i.e., denaturation in the stomach. Examples of stabilizers for use in the composition include buffers, amino acids such as glycine and lysine, carbohydrates such as dextrose, mannose, galactose, fructose, lactose, sucrose, maltose, sorbitol, mannitol, etc.

In further embodiments, the present disclosure may include the use of a pharmaceutical lipid vehicle compositions that incorporate compositions comprising fibroblasts, modified fibroblasts, and/or products derived from fibroblasts, one or more lipids, and an aqueous solvent. As used herein, the term "lipid" will be defined to include any of a broad range of substances that is characteristically insoluble in water and extractable with an organic solvent. This broad class of compounds is well known to those of skill in the art, and as the term "lipid" is used herein, it is not limited to any particular structure. Examples include compounds which contain long-chain aliphatic hydrocarbons and their derivatives. A lipid may be naturally occurring or synthetic (i.e., designed or produced by man). However, a lipid is usually a biological substance. Biological lipids are well known in the art, and include for example, neutral fats, phospholipids, phosphoglycerides, steroids, terpenes, lysolipids, glycosphingolipids, glycolipids, sulphatides, lipids with ether and ester-linked fatty acids and polymerizable lipids, and combinations thereof. Of course, compounds other than those specifically described herein that are understood by one of skill in the art as lipids are also encompassed by the compositions and methods of the present disclosure.

One of ordinary skill in the art would be familiar with the range of techniques that can be employed for dispersing a composition in a lipid vehicle. For example, the composition(s) comprising fibroblasts, modified fibroblasts, and/or products derived from fibroblasts may be dispersed in a solution containing a lipid, dissolved with a lipid, emulsified with a lipid, mixed with a lipid, combined with a lipid, covalently bonded to a lipid, contained as a suspension in a lipid, contained or complexed with a micelle or liposome, or otherwise associated with a lipid or lipid structure by any means known to those of ordinary skill in the art. The dispersion may or may not result in the formation of liposomes.

The composition(s) comprising fibroblasts, modified fibroblasts, and/or products derived from fibroblasts, may be formulated into a composition in a free base, neutral or salt form. Pharmaceutically acceptable salts, include the acid addition salts, e.g., those formed with the free amino groups of a proteinaceous composition, or which are formed with inorganic acids such as for example, hydrochloric or phosphoric acids, or such organic acids as acetic, oxalic, tartaric or mandelic acid. Salts formed with the free carboxyl groups can also be derived from inorganic bases such as for example, sodium, potassium, ammonium, calcium or ferric hydroxides; or such organic bases as isopropylamine, trimethylamine, histidine or procaine. Upon formulation, solutions will be administered in a manner compatible with the dosage formulation and in such amount as is therapeutically effective. The formulations are easily administered in a variety of dosage forms such as formulated for parenteral administrations such as injectable solutions, or aerosols for delivery to the lungs, or formulated for alimentary administrations such as drug release capsules and the like.

B. Routes of Administration

The therapeutic agents of the disclosure may be administered by the same route of administration or by different routes of administration. The route of administration of the composition may be, for example, intravenously, intracerebrally, intracranially, intramuscularly, subcutaneously, topically, orally, mucosally, intradermally, transdermally, intraperitoneally, intraarterially, intraorbitally, by implantation, intravaginally, intrarectally, intrathecally, intraarticularly, intraventricularly, intrasynovially, or intranasally; by inhalation, injection, infusion, continuous infusion, localized perfusion bathing target cells directly, via a catheter, via a lavage; in creams or in lipid compositions (e.g., liposomes); by other method or any combination of the forgoing as would be known to one of ordinary skill in the art (see, for example, Remington's Pharmaceutical Sciences, 18th Ed. Mack Printing Company, 1990, specifically incorporated by reference herein in its entirety).

In some embodiments, the composition(s) comprising fibroblasts, modified fibroblasts, and/or products derived from fibroblasts, is delivered systemically or locally. In some embodiments, the composition comprising fibroblasts, modified fibroblasts, and/or products derived from fibroblasts, is delivered by peripheral injection, such as intravenous injection.

1. Parenteral Routes

Thus, in some embodiments, the composition(s) comprising fibroblasts, modified fibroblasts, and/or products derived from fibroblasts, may be administered via a parenteral route. As used herein, the term "parenteral" includes routes that bypass the alimentary tract. Specifically, the pharmaceutical compositions disclosed herein may be administered for example, but not limited to retro-orbitally, intracerebrally, intracranially, intravenously, intradermally, intramuscularly, intraarterially, intrathecally, subcutaneous, or intraperitoneally U.S. Pat. Nos. 6,7537,514, 6,613,308, 5,466,468, 5,543,158; 5,641,515; and 5,399,363 (each specifically incorporated herein by reference in its entirety).

Solutions of the active compounds as free base or pharmacologically acceptable salts may be prepared in water suitably mixed with a surfactant, such as hydroxypropylcellulose. Dispersions may also be prepared in glycerol, liquid polyethylene glycols, and mixtures thereof and in oils. Under ordinary conditions of storage and use, these preparations contain a preservative to prevent the growth of microorganisms. The pharmaceutical forms suitable for injectable use include sterile aqueous solutions or dispersions and sterile powders for the extemporaneous preparation of sterile injectable solutions or dispersions (see, e.g., U.S. Pat. No. 5,466,468, specifically incorporated herein by reference in its entirety). In all cases the form must be sterile and must be fluid to the extent that easy injectability exists. It must be stable under the conditions of manufacture and storage and must be preserved against the contaminating action of microorganisms, such as bacteria and fungi. The carrier can be a solvent or dispersion medium containing, for example, water, ethanol, polyol (i.e., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous, and intraperitoneal administration. In this connection, sterile aqueous media that can be employed will be known to those of skill in the art in light of the present disclosure. For example, one dosage may be dissolved in isotonic NaCl solution and injected at the proposed site of infusion, (see for example, "Remington's Pharmaceutical Sciences" 15th Edition, pages 1035-1038 and 1570-1580). Some variation in dosage will necessarily occur depending on the condition of the subject being treated. The person responsible for administration will, in any event, determine the appropriate dose for the individual subject. Moreover, for human administration, preparations should meet sterility, pyrogenicity, general safety and purity standards as required by FDA Office of Biologics standards.

Sterile injectable solutions may be prepared by incorporating the active compounds in the required amount in the appropriate solvent with various of the other ingredients enumerated above, as required, followed by filtered sterilization, for example. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof. A powdered composition is combined with a liquid carrier such as, e.g., water or a saline solution, with or without a stabilizing agent.

2. Alimentary Routes

In particular embodiments of the present disclosure, the composition(s) comprising fibroblasts, modified fibroblasts, and/or products derived from fibroblasts, is formulated to be administered via an alimentary route. Alimentary routes include all possible routes of administration in which the composition is in direct contact with the alimentary tract. Specifically, the pharmaceutical compositions disclosed herein may be administered orally, buccally, rectally, or sublingually. As such, these compositions may be formulated with an inert diluent or with an assimilable edible carrier, or they may be enclosed in hard- or soft-shell gelatin capsule, or they may be compressed into tablets, or they may be incorporated directly with the food of the diet.

In certain embodiments, the active compounds may be incorporated with excipients and used in the form of ingestible tablets, buccal tables, troches, capsules, elixirs, suspensions, syrups, wafers, and the like (Mathiowitz et al., 1997; Hwang et al., 1998; U.S. Pat. Nos. 5,641,515; 5,580,579 and 5,792, 451, each specifically incorporated herein by reference in its entirety). The tablets, troches, pills, capsules and the like may also contain the following: a binder, such as, for example, gum tragacanth, acacia, cornstarch, gelatin or combinations thereof; an excipient, such as, for example, dicalcium phosphate, mannitol, lactose, starch, magnesium stearate, sodium saccharine, cellulose, magnesium carbonate or combinations thereof; a disintegrating agent, such as, for example, corn starch, potato starch, alginic acid or combinations thereof; a lubricant, such as, for example, magnesium stearate; a sweetening agent, such as, for example, sucrose, lactose, saccharin or combinations thereof; a flavoring agent, such as, for example peppermint, oil of wintergreen, cherry flavoring, orange flavoring, etc. When the dosage unit form is a capsule, it may contain, in addition to materials of the above type, a liquid carrier. Various other materials may be present as coatings or to otherwise modify the physical form of the dosage unit. For instance, tablets, pills, or capsules may be coated with shellac, sugar, or both. When the dosage form is a capsule, it may contain, in addition to materials of the above type, carriers such as a liquid carrier. Gelatin capsules, tablets, or pills may be enterically coated. Enteric coatings prevent denaturation of the composition in the stomach or upper bowel where the pH is acidic. See, e.g., U.S. Pat. No. 5,629,001. Upon reaching the small intestines, the basic pH therein dissolves the coating and permits the composition to be released and absorbed by specialized cells, e.g., epithelial enterocytes and Peyer's patch M cells. A syrup of elixir may contain the active compound sucrose as a sweetening agent methyl and propylparabens as preservatives, a dye and flavoring, such as cherry or orange flavor. Of course, any material used in preparing any dosage unit form should be pharmaceutically pure and substantially non-toxic in the amounts employed. In addition, the active compounds may be incorporated into sustained-release preparation and formulations.

For oral administration, the composition(s) comprising fibroblasts, modified fibroblasts, and/or products derived from fibroblasts, of the present disclosure may alternatively be incorporated with one or more excipients in the form of a mouthwash, dentifrice, buccal tablet, oral spray, or sublingual orally-administered formulation. For example, a mouthwash may be prepared incorporating the active ingredient in the required amount in an appropriate solvent, such as a sodium borate solution (Dobell's Solution). Alternatively, the active ingredient may be incorporated into an oral solution such as one containing sodium borate, glycerin and potassium bicarbonate, or dispersed in a dentifrice, or added in a therapeutically-effective amount to a composition that may include water, binders, abrasives, flavoring agents, foaming agents, and humectants. Alternatively, the compositions may be fashioned into a tablet or solution form that may be placed under the tongue or otherwise dissolved in the mouth.

Additional formulations that are suitable for other modes of alimentary administration include suppositories. Suppositories are solid dosage forms of various weights and shapes, usually medicated, for insertion into the rectum. After insertion, suppositories soften, melt or dissolve in the cavity fluids. In general, for suppositories, traditional carriers may include, for example, polyalkylene glycols, triglycerides or combinations thereof. In certain embodiments, suppositories may be formed from mixtures containing, for example, the active ingredient in the range of about 0.5% to about 10% (by weight), and preferably about 1% to about 2% (by weight).

3. Miscellaneous Routes

In other embodiments of the disclosure, the composition(s) comprising fibroblasts, modified fibroblasts, and/or products derived from fibroblasts, may be formulated for administration via various miscellaneous routes, for example, topical (i.e., transdermal) administration, mucosal administration (intranasal, vaginal, etc.) and/or inhalation.

Pharmaceutical compositions for topical administration may include the active compound formulated for a medicated application such as an ointment, paste, cream or powder. Ointments include all oleaginous, adsorption, emulsion and water-soluble based compositions for topical application, while creams and lotions are those compositions that include an emulsion base only. Topically administered medications may contain a penetration enhancer to facilitate adsorption of the active ingredients through the skin. Suitable penetration enhancers include glycerin, alcohols, alkyl methyl sulfoxides, pyrrolidones and luarocapram. Possible bases for compositions for topical application include polyethylene glycol, lanolin, cold cream and petrolatum as well as any other suitable absorption, emulsion or water-soluble ointment base. Topical preparations may also include emulsifiers, gelling agents, and antimicrobial preservatives as necessary to preserve the active ingredient and provide for a homogenous mixture. Transdermal administration of the present disclosure may also comprise the use of a "patch". For example, the patch may supply one or more active substances at a predetermined rate and in a continuous manner over a fixed period of time.

In certain embodiments, the pharmaceutical composition(s) comprising fibroblasts, modified fibroblasts, and/or products derived from fibroblasts, may be delivered by eye drops, intranasal sprays, inhalation, and/or other aerosol delivery vehicles. Methods for delivering compositions directly to the lungs via nasal aerosol sprays has been described e.g., in U.S. Pat. Nos. 5,756,353 and 5,804,212 (each specifically incorporated herein by reference in its entirety). Likewise, the delivery of drugs using intranasal microparticle resins (see, e.g., Takenaga et al., 1998) and lysophosphatidyl-glycerol compounds (see, e.g., U.S. Pat. No. 5,725,871, specifically incorporated herein by reference in its entirety) are also well-known in the pharmaceutical arts. Likewise, transmucosal drug delivery in the form of a polytetrafluoroetheylene support matrix is described in, e.g., U.S. Pat. No. 5,780,045 (specifically incorporated herein by reference in its entirety).

The term aerosol refers to a colloidal system of finely divided solid of liquid particles dispersed in a liquefied or pressurized gas propellant. The typical aerosol of the present disclosure for inhalation will consist of a suspension of active ingredients in liquid propellant or a mixture of liquid propellant and a suitable solvent. Suitable propellants include hydrocarbons and hydrocarbon ethers. Suitable containers will vary according to the pressure requirements of the propellant. Administration of the aerosol will vary according to subject's age, weight and the severity and response of the symptoms.

C. Dosing

The appropriate dosage amount of a composition(s) of the present disclosure administered to the subject can be determined by physical and physiological factors such as body weight, severity and course of condition, the type of disease being treated, the clinical condition of the individual, previous or concurrent therapeutic interventions, the individual's clinical history and response to the treatment, idiopathy of the subject, the route of administration, and the discretion of the attending physician. Depending upon the dosage and the route of administration, the number of administrations of a preferred dosage and/or an effective amount may vary according to the response of the subject. The practitioner responsible for administration will, in any event, determine the concentration of active ingredient(s) in a composition and appropriate dose(s) for the individual subject.

In certain embodiments, pharmaceutical compositions may comprise, for example, at least about 0.1% (by weight) of an active compound. In other embodiments, the active compound may comprise between about 2% to about 75% of the weight of the unit, or between about 25% to about 60%, for example, and any range derivable therein. Naturally, the amount of active compound(s) in each therapeutically useful composition may be prepared in such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

The treatments may include various "unit doses." Unit dose is defined as containing a predetermined-quantity of the therapeutic composition. The quantity to be administered, and the particular route and formulation, is within the skill of determination of those in the clinical arts. A unit dose need not be administered as a single injection but may comprise continuous infusion over a set period of time. In some embodiments, a unit dose comprises a single administrable dose.

The quantity to be administered, both according to number of treatments and unit dose, depends on the treatment effect desired. An effective dose is understood to refer to an amount necessary to achieve a particular effect. Furthermore, such doses can be administered at multiple times during a day, and/or on multiple days, weeks, or months.

Precise amounts of the therapeutic composition also depend on the judgment of the practitioner and are peculiar to each individual. Factors affecting dose include physical and clinical state of the patient, the route of administration, the intended goal of treatment (alleviation of symptoms versus cure) and the potency, stability and toxicity of the particular therapeutic substance or other therapies a subject may be undergoing.

VI. Kits of the Disclosure

Any of the cellular and/or non-cellular compositions described herein or similar thereto may be comprised in a kit. In a non-limiting example, one or more reagents for use in methods for treatment of kidney disease may be comprised in a kit. Such reagents may include fibroblasts, modified fibroblasts, and/or products derived from fibroblasts, media, enzymes, buffers, nucleotides, salts, primers, and so forth. The kit components are provided in suitable container means.

Some components of the kits may be packaged either in aqueous media or in lyophilized form. The container means of the kits will generally include at least one vial, test tube, flask, bottle, syringe or other container means, into which a component may be placed, and preferably, suitably aliquoted. Where there are more than one component in the kit, the kit also will generally contain a second, third or other additional container into which the additional components may be separately placed. However, various combinations of components may be comprised in a vial. The kits of the present disclosure also will typically include a means for containing the components in close confinement for commercial sale. Such containers may include injection or blow molded plastic containers into which the desired vials are retained.

When the components of the kit are provided in one and/or more liquid solutions, the liquid solution is an aqueous solution, with a sterile aqueous solution being particularly useful. In some cases, the container means may itself be a syringe, pipette, and/or other such like apparatus, or may be a substrate with multiple compartments for a desired reaction.

Some components of the kit may be provided as dried powder(s). When reagents and/or components are provided as a dry powder, the powder can be reconstituted by the addition of a suitable solvent. It is envisioned that the solvent may also be provided in another container means. The kits may also comprise a second container means for containing a sterile acceptable buffer and/or other diluent.

In specific embodiments, reagents and materials include primers for amplifying desired sequences, nucleotides, suitable buffers or buffer reagents, salt, and so forth, and in some cases the reagents include apparatus or reagents for isolation of a particular desired cell(s).

In particular embodiments, there are one or more apparatuses in the kit suitable for extracting one or more samples from an individual. The apparatus may be a syringe, fine needles, scalpel, and so forth.

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

EXAMPLES

The following examples are included to demonstrate certain non-limiting aspects of the disclosure. It should be appreciated by those of skill in the art that the techniques disclosed in the examples that follow represent techniques discovered by the inventors to function well in the practice of the disclosure. However, those of skill in the art should, in light of the present disclosure, appreciate that many changes can be made in the specific embodiments that are disclosed and still obtain a like or similar result without departing from the spirit and scope of the disclosure.

Example 1

Fibroblast Protect from Renal Ischemia Reperfusion Injury

CD1 female mice of 6-8 weeks of age where anesthetized with ketamine (100 mg/kg) and xylazine (20 mg/kg) administered intraperitoneally. Renal pedicles were bluntly dissected and a microvascular clamp was placed on the left renal pedicle for 25 minutes. Following induced ischemia clamps were removed along with the right kidney. Creatinine was assessed at the reference laboratory. 10 animals had sham surgery (unclamped), 10 animals had ischemia and were treated with 500 microliters of phosphate buffered saline via tail vein (PBS), 10 animals were administered via tail vein 500,000 bone marrow mesenchymal stem cells after ischemia induction (MSC), 10 animals had CD73 selected foreskin fibroblasts administered via tail vein at a concentration of 500,000 cells. Assessment of creatinine was performed at 12, 24, and 48 hours (FIG. 1). The order of bars on the figure from left to right are control, PBS, MSCs, and CD73-positive foreskin fibroblasts. A significant protection from creatinine upregulation was induced by CD73-positive fibroblasts, implying renal protection by fibroblasts.

What is claimed is:

1. A method of treating kidney disease in an individual in need thereof, comprising administering to the individual a prophylactically or therapeutically effective amount of a composition comprising fibroblasts and/or modified fibroblasts.

2. The method of claim 1, wherein the fibroblasts and/or modified fibroblasts are derived from mobilized peripheral blood that is obtained by:
   (a) administering to the individual one or more agents selected from the group consisting of G-CSF, GM-CSF, flt-3 ligand, plerixafor, hyperbaric oxygen, ozone therapy, and a combination thereof;
   (b) collecting the peripheral blood from the individual; and
   (c) harvesting the fibroblasts and/or modified fibroblasts from the peripheral blood.

3. The method of claim 1, wherein said fibroblasts, and/or modified fibroblasts are autologous, allogeneic, or xenogeneic with respect to the individual.

4. The method of claim 1, wherein said fibroblasts, and/or modified fibroblasts express markers selected from the group consisting of c-Kit, vimentin, extracellular vimentin, Cyclin D2, Snail, E-cadherin, SOX-2, Hey1, SMA, Nkx2.5, GATA4, CD105, CD90, CD29, CD73, CD34, CD44, CD45, Wt1, and a combination thereof.

5. The method of claim 1, wherein said fibroblasts, and/or modified fibroblasts do not express markers selected from the group consisting of CD45, CD34 and CD14, MHC II, and a combination thereof.

6. The method of claim 1, wherein said fibroblasts and/or modified fibroblasts are hypoimmunogenic.

7. The method of claim 1, wherein said fibroblasts and/or modified fibroblasts, express markers selected from the group consisting of Oct-4, CD-34, KLF-4, Nanog, Sox-2, Rex-1, GDF-3, Stella, and a combination thereof, and/or express enhanced levels of GDF-11 compared to mesenchymal stem cells.

8. The method of claim 1, wherein said fibroblasts, and/or modified fibroblasts comprise upregulation of genes involved in the cell cycle, DNA replication, and/or purine metabolism when compared to standard or non-modified fibroblasts or mesenchymal stem cells, wherein said genes involved in the cell cycle comprise genes capable of expressing cyclins and cyclin dependent kinases.

9. The method of claim 1, wherein said fibroblasts, and/or modified fibroblasts comprise downregulation of genes involved in cell adhesion, extracellular matrix (ECM)-receptor interaction, differentiation, development, TGF-β signaling, and/or TSP-1-induced apoptosis when compared to standard or non-modified fibroblasts or mesenchymal stem cells, wherein said genes involved in TGF-beta signaling genes comprise SMAD1, SMAD2, SMAD3, SMAD4, GITR, PD-L1, CD5, and/or CD31.

10. The method of claim 1, wherein one or more renoprotective and/or renoregenerative agents are administered along with said fibroblasts and/or modified fibroblasts wherein said renoprotective and/or renoregenerative agents comprise metformin and/or analogues thereof.

11. The method of claim 1, wherein said modified fibroblasts are fibroblasts modified by treatment with hypoxia and/or treatment with histone deacetylase inhibitor, oxytocin, and/or DNA methyltransferase inhibitors.

12. The method of claim 11, wherein said modified fibroblasts are modified with oxytocin.

13. The method of claim 11, wherein the modified fibroblasts are treated before delivery to the individual, during delivery to the individual, and/or after delivery to the individual.

14. The method of claim 11, wherein oxytocin is exposed to the modified fibroblasts in vitro for a period ranging between 1 minute to 4 weeks.

15. The method of claim 11, wherein oxytocin is administered at a concentration ranging between 10 nM-10 µM.

16. The method of claim 11, wherein oxytocin is administered to the individual and/or wherein oxytocin is exposed to the cells prior to, during, and/or after delivery to the individual.

17. The method of claim 11, wherein the kidney disease is associated with chemotherapy administration or radiation administration.

18. The method of claim 1, wherein said kidney disease is quantified as an increase in serum creatinine level of at least 0.5 mg/dL over a baseline serum creatinine measured in the individual or from a standard.

19. The method of claim 1, wherein said kidney disease is quantified by an increase in one or more serum/blood biomarkers, one or more urine biomarkers, or both.

20. The method of claim 1, wherein the therapeutically effective amount of fibroblasts and/or modified fibroblasts is between about approximately $7 \times 10^5$ cells/kg of individual's body weight and approximately $7 \times 10^6$ cells/kg of individual's body weight.

21. The method of claim 1, wherein the fibroblasts and/or modified fibroblasts are administered to the individual at least 48 hours following the onset or diagnosis of the kidney disease.

22. The method of claim 1, wherein said modified fibroblasts are fibroblasts treated with one or more compositions capable of enhancing the modified fibroblasts' ability to suppress production of TGF-beta from Th3 cells when compared to the fibroblasts prior to the treatment.

* * * * *